United States Patent [19]

Stanton

[11] 4,257,262
[45] Mar. 24, 1981

[54] TESTING APPARATUS FOR CASSETTE TYPE TAPE RECORDERS

[76] Inventor: Peter R. Stanton, 76 Showground Rd., Castle Hill, Sydney, New South Wales, Australia, 2154

[21] Appl. No.: 52,311

[22] Filed: Jun. 26, 1979

[30] Foreign Application Priority Data

Jun. 26, 1978 [AU] Australia ............... PD 4851/78
Sep. 20, 1978 [AU] Australia ............... 40016/78

[51] Int. Cl.³ ............................................. G01L 3/18
[52] U.S. Cl. ................................... 73/134; 73/136 A
[58] Field of Search ............... 73/134, 136 A, 136 R, 73/160, 143, 1 C, 136 B

[56] References Cited

U.S. PATENT DOCUMENTS 3,771,358  11/1973  Yamano ........................... 73/134
3,942,367  3/1976   Thompson ........................ 73/134

Primary Examiner—Donald O. Woodiel
Attorney, Agent, or Firm—Lowe, Kokjer, Kircher, Wharton & Bowman

[57] ABSTRACT

A testing apparatus for cassette type tape recording and/or playback machines has a cassette shell for mounting on the machine in place of the regular tape cassette, the cassette shell having driven means such as spools displaceably mounted within the cassette shell and adapted to be engaged and displaced respectively by the forward and rewind spindles of the machine when either of such spindles is actuated. Indicator means indicate the torque applied to either of the driven means by virtue of an indicating pointer adapted to move over a scale from a central rest position to which the pointer is spring biased, flexible means such as leader tape interconnecting the pointer to both of the driven means. Preferably the spring biasing and pointer are integrally formed in a T-shape with a pivotal mounting at the junction of the T such that the arms bend resiliently upon displacement of the pointer.

9 Claims, 3 Drawing Figures

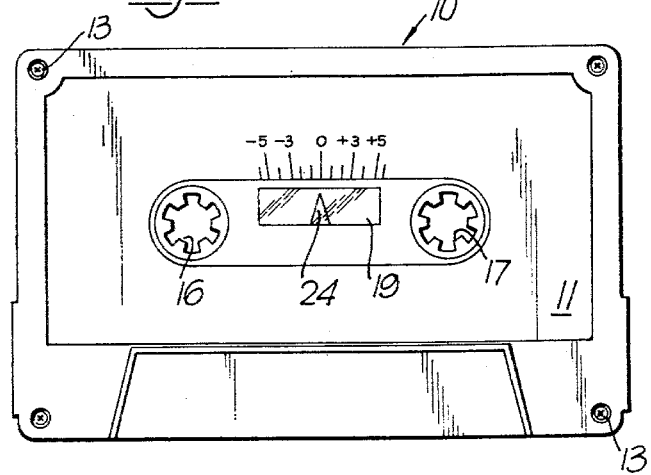
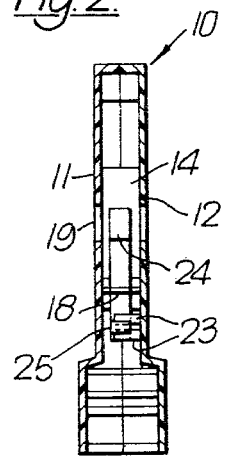
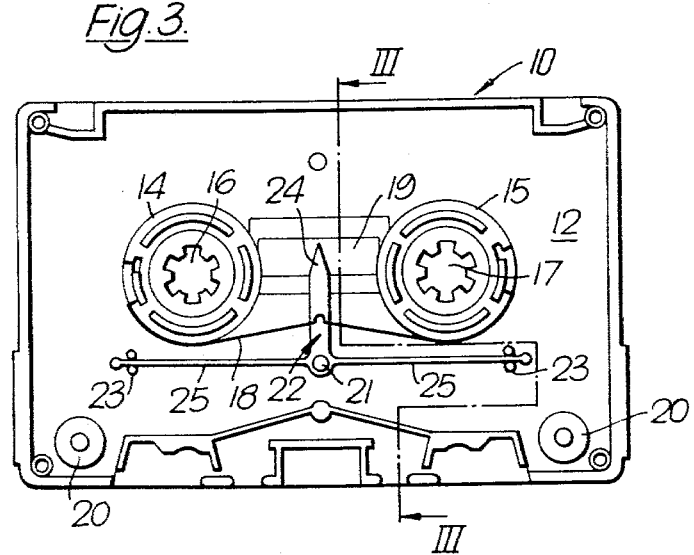

TESTING APPARATUS FOR CASSETTE TYPE TAPE RECORDERS

FIELD OF THE INVENTION

The present invention relates to apparatus for testing cassette type tape recording and/or playback machines which will be referred to hereinafter for convenience as cassette type tape recorders. The term "cassette type tape recorders" is used in this specification to refer to a machine intended for use with any form or size of cassette which comprises a cassette shell containing a pair of spools with recording tape wound thereon and extending therebetween over suitable guides so that in use one spool is functioning as a supply spool and the other as a take-up spool.

For sound recordings, various standard sizes have been adopted for example one size for domestic musical recordings and other sizes for office dictating machines. The field of the invention also extends to apparatus for testing machines which operate on larger size units which may also be known as "cartridges".

BACKGROUND TO THE INVENTION

U.S. Pat. No. 3,771,358 (Y. Yamano) discloses a testing apparatus for measuring the torque exerted by the take-up reel shaft of a tape recorder and also permits measurement of the torque applied in fast forward or rewind modes of operation. The embodiments of Yamano are all characterized by recording tape extending over the usual guide rollers at the forward corners of the cassette shell so that in use the tape will pass over the recording head and between a pich roller and drive capstan. The tape is driven as in a conventional cassette towards the take-up spool when the tape recorder is in a normal record/playback mode. The take-up spool comprises an outer ring around which the tape is wound and an inner ring linked to the outer ring through a helical torsion spring, the inner ring being adapted to be driven by the take-up spindle of the tape recorder. A pointer from the inner ring overlaps a portion of the outer ring on which a scale is inscribed so that in monitoring the applied torque, a reading is obtained depending on the displacement of the inner ring relative to the outer ring.

Thus in the normal record/playback mode, a measurement is made of the dynamic torque of the take-up spindle, the tape being advance over the capstan at a constant rate and having a braking function on the outer ring which thereby lags the displacement of the inner ring which is driven by the take-up spindle.

For proper operation of a tape recorder it is essential that there is sufficient torque applied by the take-up spindle at normal operational speed for the tape between the capstan and the take-up spool to be alwyas under tension since otherwise the tape can jam. On the other hand the tension must not be so great as to risk tape breakage and by virtue of the calibration of the Yamano apparatus, a technician can set the torque within a desired range and a non-expert with the use of the device can determine whether, after a given period of service, the machine has retained a torque setting within an acceptable range. When the Yamano system is used to monitor applied torque for either rewind or fast forward, the tension or drag on the tape causes relative rotational movement between the outer ring and the inner ring, the extent of movement indicatiang the applicable torque and suitable calibration may be provided so this can be read.

Another proposal in the field of testing apparatus for cassette type tape recorders is that of German Patent Specification No. 1919371. For the purpose of monitoring the performance of the take-up spindle and the rewind spindle, respective spools are provided within the cassette case, the periphery of each spool being grooved so that a wire is wound around the spool with one end of the wire attached to a fixed mounting and the other end is attached to a helical extension spring. The machine is switched on and the test device merely indicates whether the applied torque exceeds a certain value by virtue of whether or not rotation of the spool occurs due to the applied torque overcoming the frictional forces imposed by the wire wrapped around the spool.

The test apparatus both of U.S. Pat. No. 3,771,358 and German No. 1919371 are both complex, involving many parts, and requiring considerable skill and labour for correct assembly. Furthermore German No. 1919371 necessitates careful adjustment of the fixed mounting of each of the wires so as to impose the correct frictional force on the spool but the device fails to indicate a measure of the torque but only indicates whether it exceeds a certain value; the device is also susceptible to change in characteristics with use and it is considered that the accuracy of this device cannot be high. Furthermore the function of the take-up spindle cannot be monitored to determine the torque applied respectively in take-up and fast forward modes.

OBJECT OF THE INVENTION

The invention is concerned with meeting the need for a simple, easily and cheaply constructed but nevertheless reliable device particularly for use by a non-expert to determine whether a particular machine is in need of servicing or not.

SUMMARY OF THE INVENTION

The present invention provides a testing apparatus for cassette type tape machines and is based on the appreciation that in a simple but nevertheless effective manner useful results can be derived by providing a device which can monitor the applied torque of the take-up spindle when the machine is switched on in either the play-back or fast forward modes and the spindle is at rest, an indicator element being displaced against spring biasing over a suitably calibrated scale; similarly the rewind torque can be monitored by placing the machine in rewind and noting the deflection of the same indicator means against spring biasing, the scale readings indicating whether the applied torque is within a safe working range or not.

The invention is implemented in a test apparatus comprising a cassette shell with first and second driven members displaceably mounted within the shell and adapted to be engaged and displaced respectively by the forward and rewind spindles of the machines when rotated, a motor of the machine driving the spindles through a clutch when the appropriate mode of operation of the machine is selected manually; the test apparatus according to the invention is characterized by the provision of an indicator element spring biased to a rest position from which the indicator element is displaceable against spring biasing to either side of the rest position, flexible means interconnecting the indicator element to each of the driven members whereby on rotation of either of the spindles of the machine, the respective driven member is displaced against the spring biasing to displace the indicator means by an amount proportional to the torque applied.

In a preferred and important embodiment of the invention, each of the driven members is a rotatable spool-like member and most conveniently the flexible means is a length of tape such as leader tape attached to the periphery of each of the spools.

In a preferred embodiment of the invention, the indicator means is in the form of an elongated pointer one end of which is visible through a clear window in a central region of the cassette located between the driven members, the opposite end of the pointer pivotally mounted in the cassette shell.

In accordance with a further inventive feature, the indicator element and the spring biasing is provided by a T-shaped moulding of plastic, the arms of the T extending laterally on opposite side of the pivotal mounting of the pointer and the tips of the arms being retained against motion at right angles to the axis of each arm. In this embodiment cheap manufacture of components can be provided yet particularly when the tips of the arms are constrained between a pair of projections on the cassette shell, reliable and accurate assembly without special tools or skilled labour can be ensured. In operation, the arms are simply flexed so that a shallow S-shape occurs on displacement of the indicator means in either direction.

A further inventive feature, which can be provided when the flexible means is in the form of a tape, is for the pointer of the indicator means to be formed from two elements which are snap fitted together, sandwiching the tape between the components in the snap fitting operation.

Embodiments of the invention can therefore be constructed very cheaply without skilled labour yet the home user can readily determine from a calibrated scale whether the deflection of the pointer corresponding to the applied torque in any particular mode is within a safe working range for the purpose of ensuring that the cassette deck can be serviced before risk of tape breakage and/or jamming arises in normal usage of the machine.

By contrast the testing apparatus of U.S. Pat. No. 3,771,358 would be very expensive to manufacture being very complicated and furthermore the monitoring function is on a different principle relying on a dynamic situation in which a tape is wound around the spool. The present invention has a different and simple structure and by contrast relies upon the appreciation that useful results can be obtained by monitoring the applied torque with the spindle in question stationary.

In contrast to Germany specification No. 19199371, the present invention permits an indication of the value of applied torque to be derived whereas the German specification discloses a system which would be complicated and expensive to manufacture and would require careful adjustments and in any event only give a "yes-no" indication.

BRIEF DESCRIPTION OF THE DRAWINGS

A preferred embodiment of the invention will now be described, for illustrative purpose only with reference to the accompanying drawings of which:

FIG. 1 is a plan view of a test cassette apparatus embodying the invention;

FIG. 2 is a cross sectional view taken along the line II—II of FIG. 3; and

FIG.3 is a plan view of the test apparatus with the upper portion of the cassette shell removed to show the interior construction.

The test apparatus as shown in the drawings is a general configuration in accordance with a conventional cassette as used on the majority of domestic type tape recorders and tape decks i.e. the length of the cassette being approximately 4 inches. Thus the test apparatus can be inserted in place of a regular cassette for the purpose of testing a tape machine.

The test apparatus comprises a cassette shell 10 formed from upper and lower half shells 11 and 12 conveniently fixed together on assembly by screws 13 at each corner of the apparatus. First and second spools 14 and 15 are rotatably mounted within the cassette shell and have respective toothed apertures 16 and 17 for accommodating the conventional rewind and take-up spindles of the machine to be tested. As shown in FIG. 3, the spools are interconnected by a piece of flexible tape 18 which in the rest position extends about 1/6th the way around each spool,, the ends of the tape being fixed to the spool by conventional tape retaining clips on the spools but not shown in the drawing. The tape is conveniently conventional leader tape.

From FIGS. 1 and 3 it will be apparent that each half shell has a central window 19 which in a conventional cassette is utilised to view the tape. Thus the components described so far all comprise conventional components for regular cassettes and these components are mass produced in large volume at very low price, the only distinction being in assembly wherein a short length of leader tape only is used to interconnect directly the spools whereas in a regular cassette the magnetic tape passes around guide rollers 20 at the front corners of the cassette and through an open front portion for contacting the playback head and the pinch roller-capstan unit of the machine.

The lower half shell 12 is however modified compared with a standard shell in providing a pivot pin 21 for an integrally formed T-shaped member 22 and two pairs of location pins 23 for retaining the end portions of the arms of the T member 22. These pins 21 and 23 can simply be integrally moulded plastic pins formed with the moulding of the lower shell 12.

The T-shaped member 22 provides an integral indicator means with spring biasing. By comparing FIGS. 2 and 3 it will be apparent that the upright portion of T member 22, which forms a pointer 24, is of approximately square cross section shape with a tapered end portion whereas arms 25 of the T member are relatively thin flat arms terminating in rib-like ends 25 which function to prevent the end portion of an arm sliding generally in its longitudinal direction out of location with its associated location pins 23.

The pointer 24 is formed from two portions which as shown in FIG. 3, are moulded so as to be snap fitted together, the tape 18 being sandwiched between the portions of the pointer.

It will be apparent from FIG. 3 that the test apparatus can be readily assembled largely from conventional components but only including a simple and unique indicator-biasing means which can be readily assembled by unskilled labour simple by engaging the T member 22 with the respective pins and snap fitting the tip portion of the pointer onto the base portion to interconnect with the tape 18.

As shown in FIG. 1, a scale is applied to the exterior of the shell 10 so as to facilitate reading off the applied torque when the test apparatus is used, the scale reading being compared with a printed table indicating the range of readings considered normal when monitoring a particular function.

For the purpose of monitoring the applied torque in normal play or recorder mode, the test cassette is placed over the spindles of the machine and manually placed in the appropriate mode, thereby causing the take-up spindle to apply torque to and turn the spool 15 which rotates in a anticlockwise direction thereby pulling the tape 18 and the pointer to the right. The pointer pivots about pivot pin 21 thereby causing the arms 25 to flex into a shallow S-shape against their inherent resilience until the applied torque equals the tension in the resiliently deformed arms 25, at which point the spool 15 and the drive spindle stall and the clutch in the machine slips. The displacement of the pointer in this condition is noted and compared against the published table to determine whether the applied torque is within a normal safe operating range.

It will be noted that although in this mode of normal play, the pinch roller and capstan of the cassette machine will be operating, they play no part in the test operation in accordance with the invention and in the event there is some defect with the capstan or pinch roller such as a tendency of the pinch roller to slip, this will not cause any false reading in the spindle torque measurement.

Similarly the applied torque of the take-up spindle is monitored simply by manually placing the cassette machine into the fast forward mode and a different deviation in the pointer in general will be found.

To monitor rewind, the appropriate button on the tape recorder is manually actuated and in this case the take-up spindle is driven to rotate the left hand spool 14 in a clockwise direction thereby displacing the pointer 24 to the left in an indentical manner against the spring biasing of the arms 25.

It will be observed that the symmetrical design of the test cassette is such that it may be used either way up if desired i.e. the lower cassette shell 12 could be on the top of the unit and the pointer viewed through the window in that shell 12.

I claim:

1. Apparatus for testing cassette-type tape machines comprising a cassette shell adapted to be mounted on a machine under test, first second driven members displaceably mounted within the cassette shell and adapted to be engaged and displaced respectively by forward and rewind spindles of the machine, and means for indicating the torque applied by either of said spindles to the respective one of said driven members, the improvement comprising said indicating means including an indicator element spring biased to a rest position and displaceable against the spring biasing to either side of said rest position, and flexible means connecting the indicator element to each of said driven members whereby on rotation of either of said spindles the associated driven member is displaced against said spring biasing to displace the indicator means by an amount proportional to the torque applied.

2. Apparatus according to claim 1 wherein each of said driven members comprises a rotatable spool-like member.

3. Apparatus according to claim 2 wherein said flexible means comprises a length of tape attached to the periphery of each of said spool-like members.

4. Apparatus according to claim 3, wherein said tape extends around a portion of the periphery of each spool when the indicator element is in its rest position.

5. Apparatus according claim 3, wherein said tape is a length of leader tape.

6. Apparatus according to claim 1, wherein the indicator element comprises an elongated pointer, one end of which is visible through a clear window in the cassette shell in the region between the driven members and the opposite end of the pointer is pivotally mounted in the cassette shell.

7. Apparatus according to claim 6, wherein said pointer and the means for spring biasing the pointer are formed from a plastic moulding,, generally of T-shape,, the arms of the T extending laterally to opposite sides of the pivotal mounting of the pointer and the tips of the arms being retained against motion at right angles to the axis of each arm.

8. Apparatus according to claim 7, wherein the arms of the T-shaped moulding extend more than half way from the pivotal mounting of the pointer towards the respective end of the cassette shell and the mounting being such that limited motion of the arm is possible in a direction along the axis of the arm.

9. Apparatus according to claim 7 wherein the pointer is formed from two portions snap fitted together and sandwiching a portion of the flexible member therebetween.

* * * * *